US006856732B2

(12) United States Patent
Liu et al.

(10) Patent No.: US 6,856,732 B2
(45) Date of Patent: Feb. 15, 2005

(54) METHOD AND APPARATUS FOR ADDING/ DROPING OPTICAL SIGNALS IN A SEMICONDUCTOR SUBSTRATE

(75) Inventors: Ansheng Liu, Cupertino, CA (US); Mario J. Paniccia, Santa Clara, CA (US); Remus Nicolaescu, San Jose, CA (US); Andrew C. Alduino, San Jose, CA (US); Ling Liao, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 09/967,365

(22) Filed: Sep. 28, 2001

(65) Prior Publication Data

US 2002/0197012 A1 Dec. 26, 2002

Related U.S. Application Data

(63) Continuation-in-part of application No. 09/881,218, filed on Jun. 13, 2001.

(51) Int. Cl.[7] ................................................ G02B 6/42
(52) U.S. Cl. ............................ 385/38; 385/15; 385/24; 385/31
(58) Field of Search ............................. 385/24, 31, 37, 385/42, 44, 15; 398/82, 83, 84, 79, 87, 89

(56) References Cited

U.S. PATENT DOCUMENTS

| 4,518,219 A | | 5/1985 | Leonberger et al. |
| 4,984,894 A | * | 1/1991 | Kondo ........................ 356/632 |

(List continued on next page.)

FOREIGN PATENT DOCUMENTS

| EP | 1094574 A1 | 4/2001 |

OTHER PUBLICATIONS

Willner, A.E., "Tunable Compensation of Channel Degrading Effects Using Nonlinearly Chirped Passive Fiber Bragg Gratings", *IEEE Journals of Selected Topics in Quantum Electronics*, vol. 5, No. 5, pp. 1298–1311, Sep./Oct. 1999.

Giles, C.R., "Lightwave Applications of Fiber Bragg Gratings", *Journal of Lightwave Technology*, vol. 15, No. 8, pp. 1391–1404, Aug. 1997.

(List continued on next page.)

*Primary Examiner*—Drew A. Dunn
*Assistant Examiner*—Joshua L Pritchett
(74) *Attorney, Agent, or Firm*—Blakely, Sokoloff, Taylor & Zafman LLP

(57) ABSTRACT

A semiconductor-based tunable add/drop method and apparatus. In one aspect of the present invention, a method according to an embodiment of the present invention includes splitting a first optical beam having multiple wavelengths into second and third optical beams with a first 3 dB optical coupler disposed in a semiconductor substrate. Portions of the second and third optical beams having a tunable wavelength are reflected back to the first 3 dB optical coupler with first and second pluralities of silicon and polysilicon interfaces, respectively, disposed along the semiconductor substrate. In another embodiment, the portions of the second and third optical beams having a tunable wavelength are reflected back to the first 3 dB optical coupler with first and second pluralities of modulated charged regions. Portions of the second and third optical beams not reflected are directed to a second 3 dB optical coupler disposed in the semiconductor substrate. The portions of the second and third optical beams not reflected are combined into a fourth optical beam with the second 3 dB optical coupler.

54 Claims, 8 Drawing Sheets

U.S. PATENT DOCUMENTS

| | | | |
|---|---|---|---|
| 5,082,342 A | | 1/1992 | Wight et al. |
| 5,379,318 A | | 1/1995 | Weber |
| 5,446,809 A | * | 8/1995 | Fritz et al. .................... 385/17 |
| 5,467,732 A | | 11/1995 | Donnelly, Jr. et al. |
| RE35,516 E | * | 5/1997 | Henry et al. .................. 385/27 |
| 6,011,881 A | * | 1/2000 | Moslehi et al. ............... 385/10 |
| 6,014,480 A | | 1/2000 | Baney |
| 6,061,481 A | * | 5/2000 | Heidrich et al. .............. 385/14 |
| 6,172,791 B1 | | 1/2001 | Gill et al. |
| 6,221,565 B1 | | 4/2001 | Jain et al. ................... 430/321 |
| 6,268,953 B1 | * | 7/2001 | Maloney ..................... 359/321 |
| 6,330,255 B1 | | 12/2001 | Hung |
| 6,363,202 B1 | | 3/2002 | Goodfellow ................ 385/140 |
| 6,438,277 B1 | | 8/2002 | Eggleton et al. |
| 6,480,513 B1 | * | 11/2002 | Kapany et al. ................ 372/20 |
| 6,600,864 B2 | | 7/2003 | Samara-Rubio et al. |
| 6,628,450 B2 | | 9/2003 | Samara-Rubio |
| 6,661,937 B2 | | 12/2003 | Sobiski et al. |
| 2002/0113966 A1 | * | 8/2002 | Shchegrov et al. ......... 356/369 |
| 2002/0197011 A1 | | 12/2002 | Liu et al. |
| 2003/0013438 A1 | | 1/2003 | Darby |
| 2003/0021305 A1 | | 1/2003 | Lundqvist |
| 2003/0025976 A1 | | 2/2003 | Wipiejewski |
| 2003/0086655 A1 | | 5/2003 | Deacon |
| 2003/0091086 A1 | | 5/2003 | Sahara et al. |
| 2003/0099018 A1 | | 5/2003 | Singh et al. |

OTHER PUBLICATIONS

Sugden, K., "Fabrication and Characterization of Bandpass Filters Based on Concatenated Chirped Fiber Gratings", *Journal of Lightwave Technology*, vol. 15, No. 8, pp. 1424–1432, Aug. 1997.

Erdogan, T., "Fiber Grating Spectra", *Journal of Lightwave Technology*, vol. 15, No. 8, pp. 1277–1294, Aug. 1997.

Hill, K. O., "Fiber Bragg Grating Technology Fundamentals and Overview", *Journal of Lightwave Technology*, vol. 15, No. 8, pp. 1263–1276, Aug. 1997.

Studenkov, P.V., "Asymmetric Twin–Waveguide 1.55–$\mu$m Wavelength Laser with a Distributed Bragg Reflector", *IEEE Photonics Technology Letters*, vol. 12, No. 5, pp. 468–470, May 2000.

"Encyclopedia.com–Results for laser", http://www.encyclopedia.com/articles/07237.html.

"Encyclopedia.com–Results for laser: Coherent Light and Its Emission in Lasers", http://www.encyclopedia.com/articles/07237.html.

"Encyclopedia.com–Results for laser: Characteristics of Lasers", http://www.encyclopedia.com/articles/07237.html.

"Encyclopedia.com–Results for laser: Applications of Lasers", http://www.encyclopedia.com/articles/07237.html.

"Laser", Encarta Encyclopedia, http://encarta.msn.com/Concise.asp?z=1&pg=2&ti=761578658.

"Howstuffworks "How Lasers Work"",http://www.howstuffworks.com/laser.htm.

"The Basics of an Atom", Howstuffworks "How Lasers Work", http://www.howstuffworks.com/laser1.htm.

"The Laser/Atom Connection", Howstuffworks "How Lasers Work", http://www.howstuffworks.com/laser2.htm.

"Three–Level Laser", Howstuffworks "How Lasers Work", http://www.howstuffworks.com/laser3.htm.

"Types of Lasers", Howstuffworks "How Lasers Work", http://www.howstuffworks.com/laser4.htm.

"Laser Classifications", Howstuffworks "How Lasers Work", http://www.howstuffworks.com/laser5.htm.

"Links", Howstuffworks "How Lasers Work", http://www.howstuffworks.com/laser6.htm.

Maluf, N., "Lasers: A Tutorial", New Focus, Opticon 2001, San Jose, CA, pp. 1–48.

* cited by examiner

US 6,856,732 B2

METHOD AND APPARATUS FOR ADDING/ DROPING OPTICAL SIGNALS IN A SEMICONDUCTOR SUBSTRATE

RELATED APPLICATION

This application is a continuation-in-part of co-pending application Ser. No. 09/881,218, filed Jun. 13, 2001, entitled "METHOD AND APPARATUS FOR TUNING A BRAGG GRATING IN A SEMICONDUCTOR SUBSTRATE," and assigned to the Assignee of the present application.

BACKGROUND OF THE INVENTION

1. Field of the Invention

The present invention relates generally to optical devices and, more specifically, the present invention relates to optical add/drop devices.

2. Background Information

The need for fast and efficient optical-based technologies is increasing as the growth rate of Internet data traffic overtakes that of voice traffic, pushing the need for fiber optic communications. Transmission of multiple optical channels over the same fiber in the dense wavelength-division multiplexing (DWDM) system provides a simple way to use the unprecedented capacity (signal bandwidth) offered by fiber optics. Commonly used optical components in the system include WDM transmitters and receivers, optical add/drop multiplexers, and optical filters such as diffraction gratings, thin-film filters, fiber Bragg gratings, and arrayed-waveguide gratings.

Optical add/drop multiplexers are used in optical telecommunications and networking industries to add new channels and drop existing channels from multi-channel optical signals. Some known add/drop devices employ complex arrangements of optical demultiplexers and multiplexers or arrayed waveguide gratings (AWGs) in combination with 2×2 optical switches for each channel of the optical signal. Other commonly known optical add/dropmultiplexers employ fiber-based Bragg gratings and circulators. Integrating the circulators with the fiber Bragg gratings is a challenge for this approach.

A fiber Bragg grating is an optical fiber device that is constructed by creating periodic changes in the refractive index of fiber core materials along the fiber length. These index changes may be formed by exposing the photosensitive core to an intense optical interference pattern. With the changes in the refractive index along the fiber length, optical beams at a particular wavelength are reflected by the fiber Bragg grating while other wavelengths are allowed to propagate through.

A limitation with current fiber Bragg gratings is that the particular wavelength reflected by the fiber Bragg grating is substantially fixed. Consequently, if different wavelengths of light are to be reflected, different fiber Bragg gratings are utilized. In some fiber Bragg gratings, nominal adjustments to the reflected wavelength are made by physically stretching the fiber Bragg grating to modify its period. The disadvantages of this technique are that the tuning range to the reflected wavelength is relatively small and the optical fiber may suffer damage from stress and strain induced by the physical stretching.

BRIEF DESCRIPTION OF THE DRAWINGS

The present invention is illustrated by way of example and not limitation in the accompanying figures.

DETAILED DESCRIPTION

Methods and apparatuses for adding and dropping DWDM channels of an optical signal traveling through a semiconductor substrate are disclosed. In the following description numerous specific details are set forth in order to provide a thorough understanding of the present invention. It will be apparent, however, to one having ordinary skill in the art that the specific details need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based tunable optical add/drop multiplexer is provided in a fully integrated solution on a single integrated circuit chip. In one embodiment, semiconductor-based waveguide gratings are employed as wavelength selective tunable Bragg grating devices. The semiconductor-based tunable Bragg gratings selectively reflect infrared or near infrared input signals at a given center wavelength with a small bandwidth. The center wavelength is shifted using various techniques including thermal or plasma optical effects in for example silicon. Embodiments of the presently described semiconductor-based tunable optical add/drop multiplexer may be utilized in broadband optical networking systems, telecommunications or the like.

Figure 1:
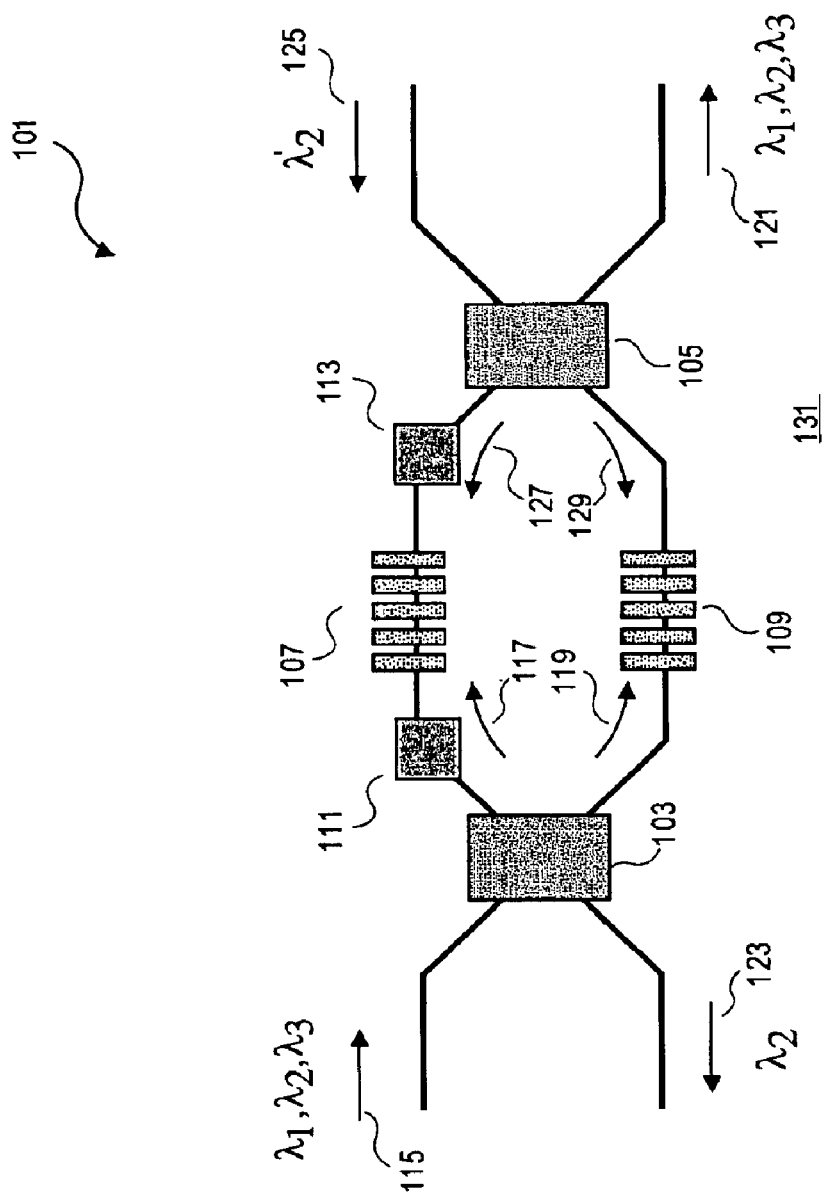
FIG. 1 is a block diagram illustrating one embodiment of a tunable optical add/drop multiplexer in accordance with the teachings of the present invention.

To illustrate, FIG. 1 is a block diagram illustrating one embodiment of a tunable add/drop multiplexer 101 in accordance with the teachings of the present invention. As shown, add/drop multiplexer 101 includes a 3 dB optical coupler 103, a 3 dB optical coupler 105, a Bragg grating 107 and a Bragg grating 109, all of which are disposed in a semiconductor substrate 131. In one embodiment, all of these elements are optically coupled through single mode rib waveguides disposed in semiconductor substrate 131 as shown in FIG. 1. In one embodiment, the inputs and outputs to the 3 dB optical couplers 103 and 105 are formed with tapered input and output optical rib waveguides in the case where 3 dB MMI couplers are used.

In one embodiment, phase adjusters 111 and 113 are disposed along the waveguides connecting the 3 dB optical couplers 103 and 105. It is noted that although phase adjusters 111 and 113 are illustrated in FIG. 1 as being coupled to Bragg grating 107, one or both phase adjusters 111 and 113 may be coupled to Bragg grating 109 in an alternate embodiment in accordance with the teachings of the present invention. In one embodiment, phase adjusters 111 and 113 are provided to compensate for any mismatches or optical path imbalances in the optical paths between 3 dB optical couplers 103 and 105 on both ends of Bragg gratings 107 and/or 109, which may occur due to process variations. In one embodiment, phase adjusters 111 and 113 are formed by depositing two thin-film heaters on semiconductor substrate 131 proximate to the respective waveguides. By adjusting the temperature of the semiconductor substrate 131 including the waveguides, the phase of the optical signals propagating through the waveguides is adjusted accordingly.

In operation, a multi-channel or multi-wavelength optical beam 115 is directed into 3 dB optical coupler 103. As shown in the example depicted, optical beam 115 includes wavelengths $\lambda_1$, $\lambda_2$ and $\lambda_3$. It is appreciated that although optical beam 115 is illustrated to include 3 wavelengths $\lambda_1$, $\lambda_2$ and $\lambda_3$, in FIG. 1, optical beam 115 may include a greater number or fewer number of wavelengths in accordance with the teachings of the present invention.

In one embodiment, optical beam 115 is split by 3 dB optical coupler 103 such that optical beams 117 and 119 are output from 3 dB optical coupler 103 as shown in FIG. 1. The optical power of optical beam 115 is substantially equally split between optical beams 117 and 119 with low optical loss over a relatively broad spectral range. The relative phase difference between optical beams 117 and 119 is substantially equal to $\pi/2$.

As shown in the depicted embodiment, Bragg gratings 107 and 109 are included in the waveguides optically coupling 3 dB optical couplers 103 and 105. In one embodiment, Bragg gratings 107 and 109 are tunable Bragg gratings disposed in semiconductor substrate 131 and are tuned to selectively reflect one or more wavelengths. In the illustrated example, Bragg gratings 107 and 109 are adjusted to have a tunable wavelength equal to $\lambda_2$. Accordingly, the portions of optical beams 117 and 119 having a wavelength equal to $\lambda_2$ are reflected back to 3 dB optical coupler 103. The remaining portions or wavelengths of optical beams 117 and 119 not reflected by Bragg gratings 107 and 109, including for example wavelengths $\lambda_1$ and $\lambda_3$, propagate through Bragg gratings 107 and 109 to 3 dB optical coupler 105.

Continuing with the example illustrated in FIG. 1, the reflected $\lambda_2$ portions of optical beams 117 and 119 that are directed back to 3 dB optical coupler 103 are combined in 3 dB optical coupler 103 and are then output as optical beam 123. As shown in FIG. 1, optical beam 123 includes the channel corresponding to wavelength $\lambda_2$. In one embodiment, phase adjuster 111 is used to adjust the optical path lengths between 3 dB optical coupler 103 and Bragg gratings 107 and 109 so that there is no additional phase difference between the two waveguides. Accordingly, optical beam 123 is output from the "lower" input waveguide of 3 dB optical coupler 103 as shown in FIG. 1. Therefore, the "lower" input waveguide of 3 dB optical coupler 103 acts as an output waveguide for the dropped channel.

The portions of optical beams 117 and 119 not reflected by Bragg gratings 107 and 109 are directed to and combined by 3 dB optical coupler 105 such that optical beam 121 is output from 3 dB optical coupler 105. As shown in FIG. 1, optical beam 121 includes the channels corresponding to wavelengths $\lambda_1$ and $\lambda_3$. In one embodiment, phase adjuster 113 is used to adjust the optical path lengths between 3 dB optical coupler 105 and Bragg gratings 107 and 109 so that there is no additional phase difference between the two waveguides. Accordingly, optical beam 121 is output from the "lower" output waveguide of 3 dB optical coupler 105 as shown in FIG. 1.

As shown in the depicted embodiment, 3 dB optical coupler 105 is also coupled to receive an optical beam 125. In one embodiment, optical beam 125 carries a channel having the same wavelength as optical beam 123. Accordingly, optical beam 125 is illustrated in FIG. 1 as having wavelength $\lambda_2'$. As shown in FIG. 1, optical beam 125 is split by 3 dB optical coupler 105 such that optical beams 127 and 129 are output from 3 dB optical coupler 105. The optical power of optical beam 125 is substantially equally split between optical beams 127 and 129 with low optical loss over a relatively broad spectral range. The relative phase difference between optical beams 127 and 129 is substantially equal to $\pi/2$.

As discussed previously, Bragg gratings 107 and 109 are adjusted to have a tunable wavelength equal to $\lambda_2$ or $\lambda_2'$. Accordingly, optical beams 127 and 129 are reflected back to 3 dB optical coupler 105. Optical beams 127 and 129 are then combined in 3 dB optical coupler 105 with the portions of optical beams 117 and 119 not reflected by Bragg gratings 107 and 109. Accordingly, optical beam 121 includes the channels corresponding to wavelengths $\lambda_1$, $\lambda_2'$ and $\lambda_3$.

Therefore, optical add/drop multiplexer 101 as shown in FIG. 1 drops the channel corresponding to wavelength $\lambda_2$ from optical beam 115 and adds the channel corresponding to wavelength $\lambda_2'$ from optical beam 125 to optical beam 121. In one embodiment, the Bragg gratings 107 and 109 can be tuned to select or reflect channels corresponding to other wavelengths such as for example $\lambda_1$ or $\lambda_3$ in accordance with the teachings with the present invention.

Figure 2A:
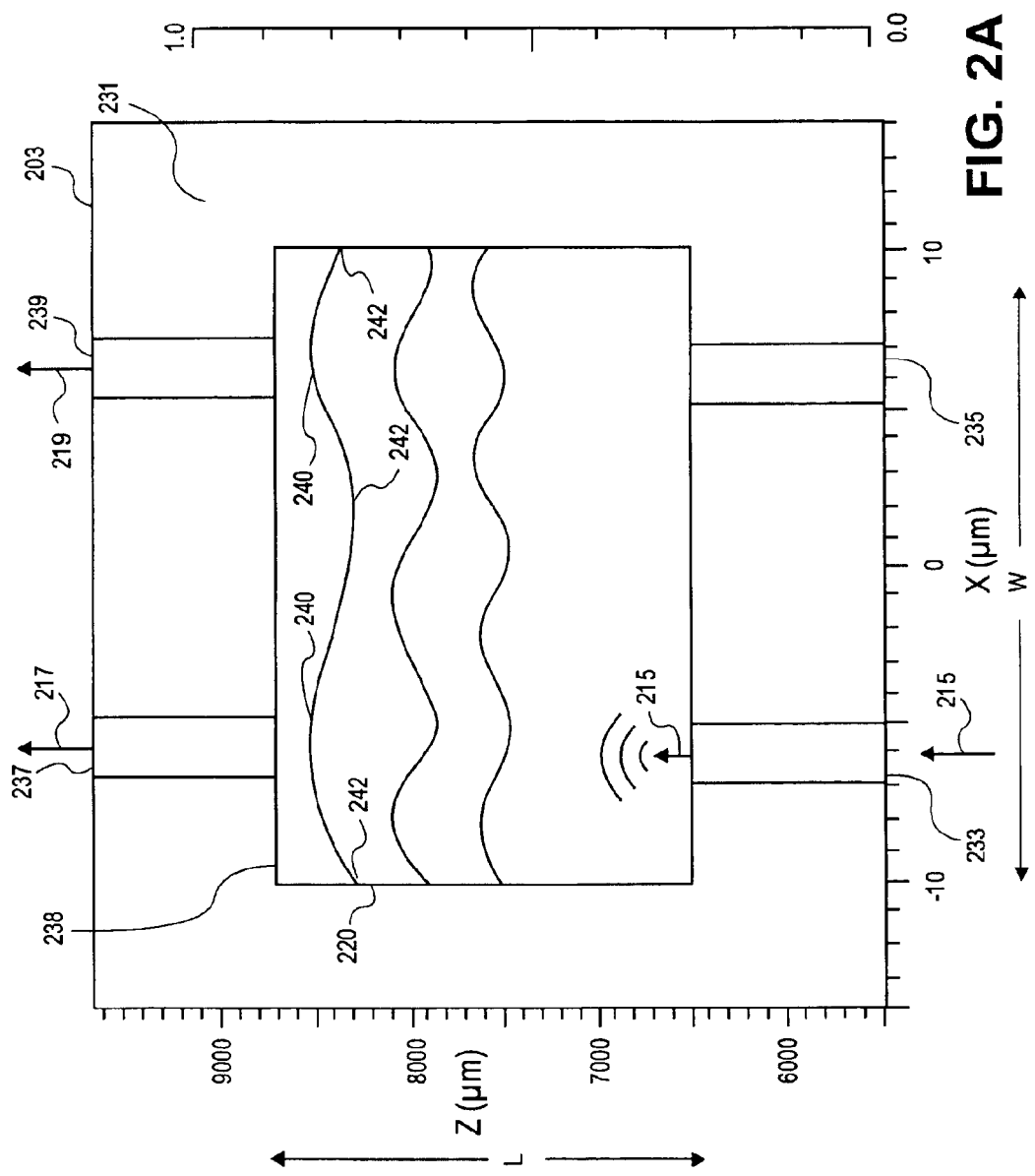
FIG. 2A is a diagram illustrating a top view of one embodiment of a 3 dB optical coupler including a 2×2 multi-mode interference (MMI) coupler in accordance with the teachings of the present invention.

FIG. 2A is a diagram illustrating a top view of one embodiment of a 3 dB optical coupler that may be employed in accordance with the teachings of the present invention. In the depicted embodiment, the 3 dB optical coupler is provided with a 2×2 multi-mode interference (MMI) coupler 203. As shown, 2×2 MMI coupler 203 includes a waveguide 238 disposed in a semiconductor substrate 231. In one embodiment, an optical beam 215 is directed into waveguide 238 through input 233. In one embodiment, optical beam 215 is confined to remain within waveguide 238 with cladding 220 until exiting. As shown, cladding 220 enclosing waveguide 238 in one embodiment has a length L and a width W and is designed to support a large number of modes in waveguide 238. In one embodiment, there are 2 inputs to waveguide 238, shown as waveguide inputs 233 and 235, and there are 2 outputs from waveguide 238, shown as waveguide outputs 237 and 239. In one embodiment, waveguide inputs and outputs 233, 235, 237 and 239 are tapered rib waveguides to and from waveguide 238.

As shown in the depicted embodiment, optical beam 215 propagates from input 233 into waveguide 238 and is eventually deflected from cladding 220 enclosing waveguide 238. The deflected wavefronts of optical beam 215 interfere with each other within waveguide 238 of 2×2 MMI coupler 203 such that maximas 240 and minimas 242 are created as shown. In one embodiment, L and W are designed such that there is a maxima 240 located at each output location corresponding to the outputs 237 and 239. Thus, the 2 outputs 237 and 239 of 2×2 MMI coupler 203 are optically coupled to the input 233 of 2×2 MMI coupler 203. Therefore, input optical beam 215 is substantially equally split into corresponding output beams 217 and 219, which are output from outputs 237 and 239, respectively. In one embodiment, optical beams 217 and 219 have substantially equal amplitude over a wide spectrum and have a phase difference of $\pi/2$.

It is appreciated that operation of 2×2 MMI coupler 203 has been described with an input optical beam 215 received at input 233 with optical beams 217 and 219 output from outputs 237 and 239. However, it is appreciated that an input optical beam can be received at input 235 and that corresponding split optical beams are output from outputs 237 and 239. In addition, it is appreciated that operation of 2×2 MMI coupler 203 can be bi-directional such that input optical beams received at outputs 237 and/or 239 are output at inputs 233 and/or 235.

Figure 2B:
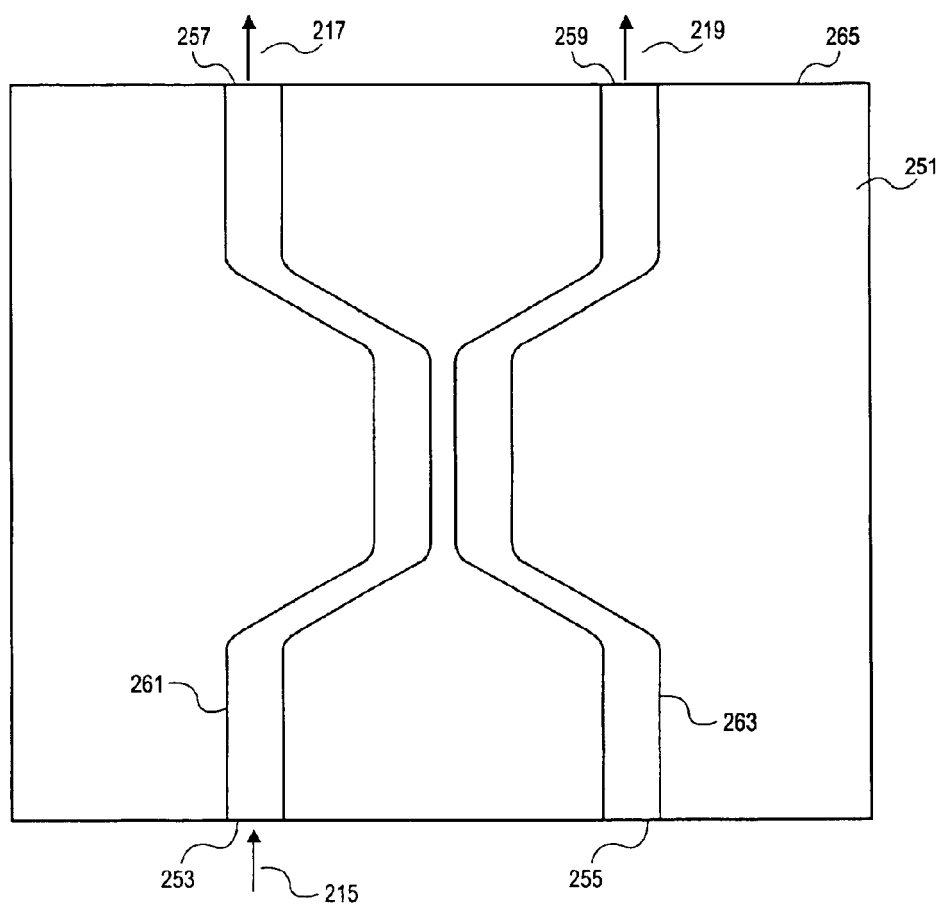
FIG. 2B is a diagram illustrating a top view of another embodiment of a 3 dB optical coupler including an evanescent waveguide coupler in accordance with the teachings of the present invention.

FIG. 2B is a diagram illustrating a top view of another embodiment of a 3 dB optical coupler in accordance with the teachings of the present invention. In the depicted embodiment, the 3 dB optical coupler is provided with an evanescent waveguide coupler 265. As shown, waveguide coupler 265 includes a waveguide 261 and a waveguide 263 disposed in a semiconductor substrate 251. As illustrated in FIG. 2B, portions of waveguides 261 and 263 are routed close to each other in semiconductor substrate 251 such that a portion of the light propagating through each waveguide 261 and 263 is optically coupled to the neighboring waveguide.

To illustrate, in one embodiment, an optical beam 215 is directed into waveguide 261 through input 253. As optical beam 215 propagates along waveguide 261, a portion is received by waveguide 263. Accordingly, optical beam 215 is split and corresponding output optical beams 217 and 219 are output from outputs 257 and 259 of waveguide coupler 265. In one embodiment, optical beams 217 and 219 have substantially equal amplitude over a wide spectrum and have a phase difference of $\pi/2$.

It is appreciated that operation of waveguide coupler 265 has been described with an input optical beam 215 received at input 253 with optical beams 217 and 219 output from outputs 257 and 259. However, it is appreciated that an input optical beam can be received at input 255 and that corresponding split optical beams are output from outputs 257 and 259. In addition, it is appreciated that operation of waveguide coupler 265 can be bi-directional such that input optical beams received at outputs 257 and/or 259 are output at inputs 253 and/or 255.

Figure 3:
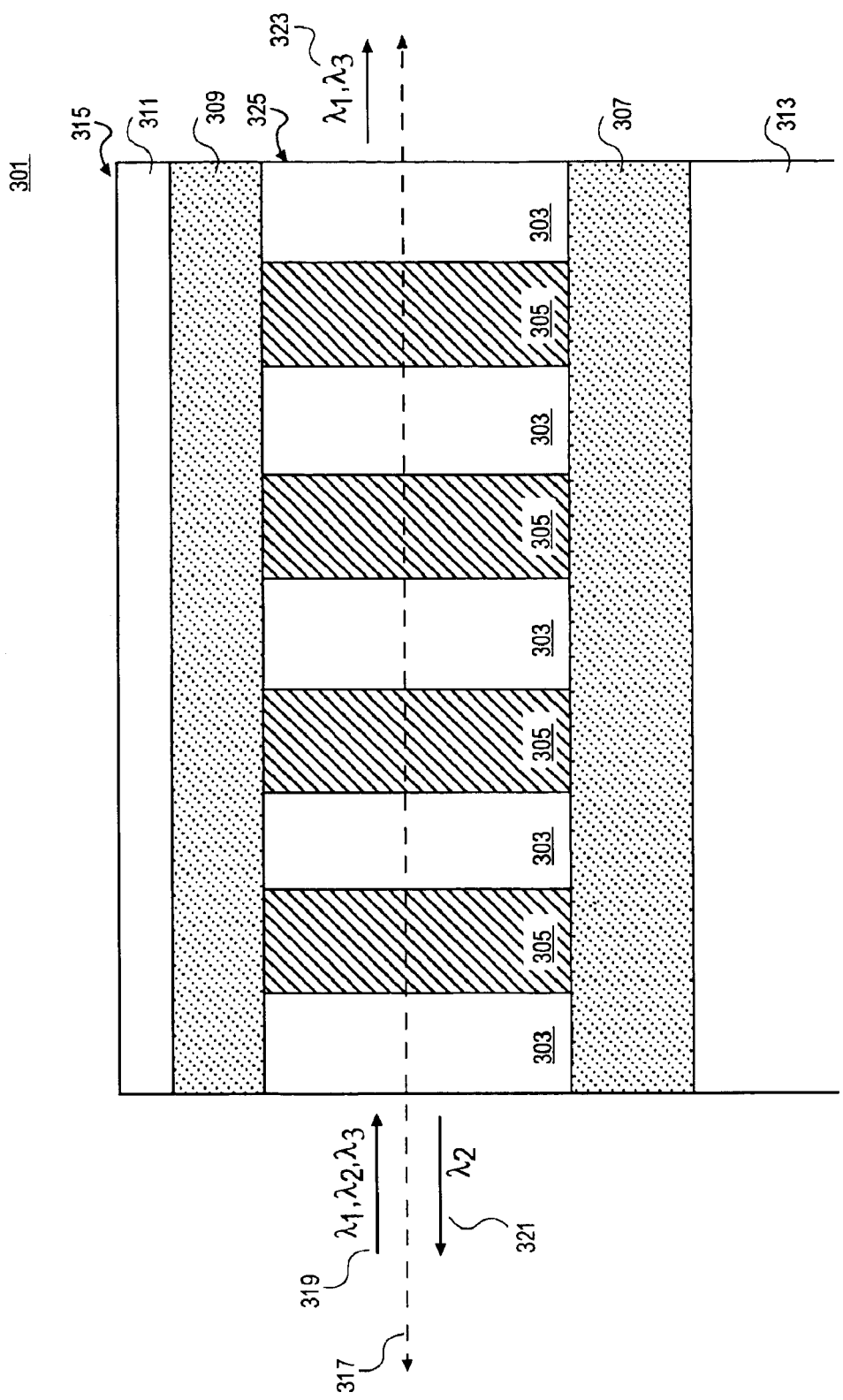
FIG. 3 is a block diagram illustrating a cross section of one embodiment of a tunable Bragg grating disposed in a semiconductor substrate including a heater in accordance with the teachings of the present invention.

FIG. 3 is a block diagram illustrating a cross section of one embodiment of a semiconductor-based tunable Bragg grating 301 disposed in a semiconductor substrate 303 in accordance with the teachings of the present invention. In the depicted embodiment, Bragg grating 301 is silicon/polysilicon grating. It is appreciated that silicon and polysilicon are example materials provided for explanation purposes and that other semiconductor materials including III-V semiconductor materials or the like may be utilized in accordance with the teachings of the present invention. As shown, a plurality of regions of polysilicon 305 are disposed in a silicon semiconductor substrate 303 such that periodic or quasi-periodic perturbations in an effective index of refraction $n_{eff}$ are provided along an optical path 317 through semiconductor substrate 303.

In one embodiment in which silicon and polysilicon are utilized, having effective refractive indexes of $n_{Si}$ and $n_{poly}$, respectively, a small effective refractive index difference $\Delta n_{eff}$ (or $n_{poly}-n_{Si}$) is provided at each interface between semiconductor substrate 303 and polysilicon 305. In one embodiment, $\Delta n_{eff}$ is approximately within the range of 0.005 to 0.03. It is appreciated that other value ranges for $\Delta n_{eff}$ may be utilized in accordance with the teachings of the present invention and that 0.005 to 0.03 is provided herewith for explanation purposes.

As illustrated in FIG. 3, semiconductor substrate 303 is included in one embodiment in a silicon-on-insulator (SOI) wafer 315. As such, an insulating layer 307 or a buried oxide layer is disposed between semiconductor substrate 303 layer and another semiconductor substrate layer 313. In one embodiment, an additional insulating layer 309 is included such that semiconductor substrate 303 layer is disposed between insulating layers 307 and 309. In one embodiment, insulating layer 309 includes an interlayer dielectric layer of the SOI wafer 315. In one embodiment, insulating layers 307 and 309 include an oxide material or the like. As a result, a waveguide 325 including optical path 317 is provided in semiconductor substrate 303 with cladding provided by insulating layers 307 and 309.

Figure 4:
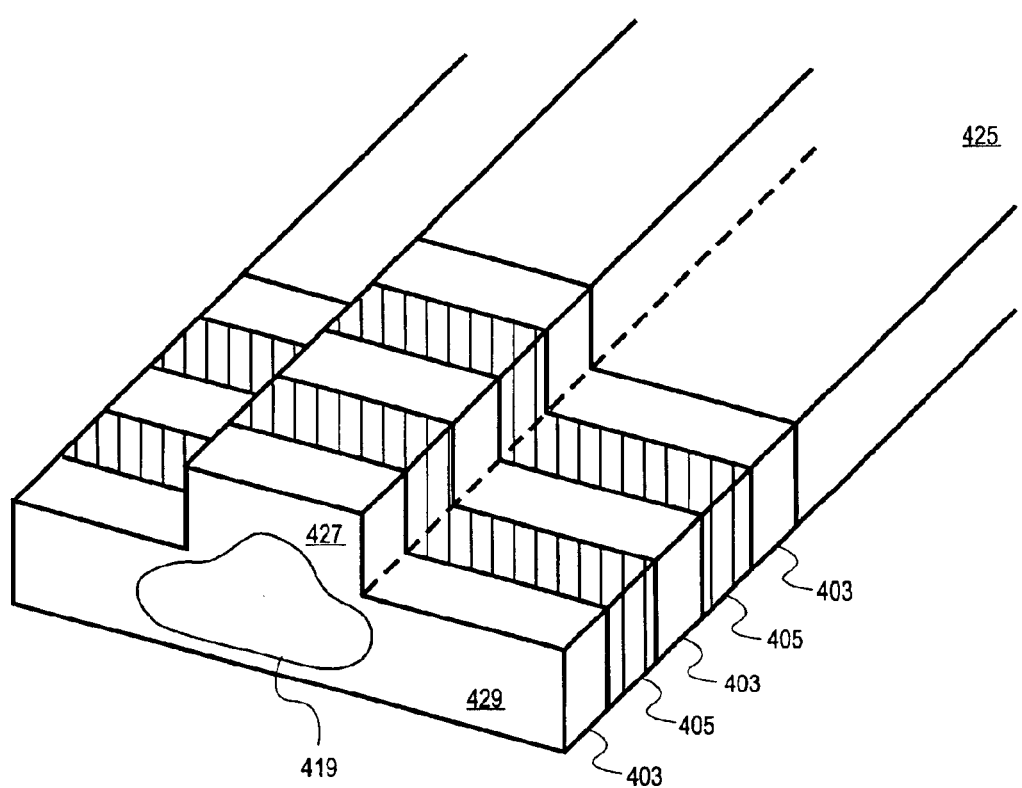
FIG. 4 is a perspective diagram illustrating one embodiment of a tunable Bragg grating disposed in a semiconductor substrate including a rib waveguide disposed in a semiconductor substrate in accordance with the teachings of the present invention.

In one embodiment, waveguide 325 is a rib waveguide. To illustrate, FIG. 4 is a perspective view illustration of one embodiment of a rib waveguide 425 of a tunable Bragg grating in accordance with the teachings of the present invention. In one embodiment, rib waveguide 425 is disposed between insulating regions 307 and 309 of SOI wafer 315 of FIG. 3.

Referring back to FIG. 4, rib waveguide 425 is disposed in a semiconductor substrate 403 and includes regions of polysilicon 405. In one embodiment, the semiconductor substrate 403 has a different index of refraction than polysilicon 405 such that periodic or quasi-periodic perturbations in an effective index of refraction are provided along an optical path through rib waveguide 425.

As shown, the rib waveguide 425 includes a rib region 427 and a slab region 429. In the embodiment illustrated in FIG. 4, the intensity distribution of a single mode optical beam 419 is shown propagating through the rib waveguide 425. As shown, the intensity distribution of optical beam 419 is such that of the majority of the optical beam 419 propagates through a portion of rib region 427 towards the interior of the rib waveguide 425. In addition, a portion of optical beam 419 propagates through a portion of slab region 429 towards the interior of the rib waveguide 425. As also shown with the intensity distribution of optical beam 419, the intensity of the propagating optical mode of beam 419 is vanishingly small at the "upper corners" of rib region 427 as well as the "sides" of slab region 429.

Referring back to the illustration in FIG. 3, an optical beam 319 is directed along optical path 317 into one end of waveguide 325. In one embodiment, optical beam 319 includes infrared or near infrared light and is confined with cladding provided by insulating layers 307 and 309 to remain within waveguide 325 along optical path 317 between the ends of waveguide 325. In one embodiment, optical beam 319 is confined as a result of total internal reflection since the oxide material of insulating layers 307 and 309 has a smaller index of refraction than the semiconductor material of semiconductor substrate 303 and polysilicon 305.

In one embodiment, optical beam 319 includes a plurality of channels having wavelengths including for example $\lambda_1$, $\lambda_2$ and $\lambda_3$. It is appreciated that although optical beam 319 has been illustrated to include three wavelengths $\lambda_1$, $\lambda_2$ and $\lambda_3$ in the illustrated example, a different number of wavelengths may be included in optical beam 319 in accordance with the teachings of the present invention.

As mentioned above, there are periodic or quasi-periodic perturbations in the effective index of refraction along optical path 317 through waveguide 325. As a result of the effective refractive index difference $\Delta n_{\mathit{eff}}$ described above, multiple reflections of an optical beam 319 occur at the interfaces between semiconductor substrate 303 and polysilicon 305 along optical path 317. In one embodiment, a Bragg reflection occurs when a Bragg condition or phase matching condition is satisfied. In particular, for uniform Bragg gratings, when the condition $$m\lambda_B = 2n_{\mathit{eff}}\Lambda, \quad \text{(Equation 1)}$$

is satisfied, where m is the diffraction order, $\lambda_B$ is the Bragg wavelength, $n_{\mathit{eff}}$ is the effective index of the waveguide and $\Lambda$ is the period of the grating, a Bragg reflection occurs.

To illustrate, FIG. 3 shows a Bragg condition existing for $\lambda_B$ equal to $\lambda_2$. Accordingly, an optical beam 321 including wavelength $\lambda_2$ is shown to be reflected back out of the waveguide 325 out from the end into which optical beam 319 is directed. In addition, the remainder of optical beam 319 continues to propagate along optical path 317 through waveguide 325 such that the remaining wavelengths (e.g. $\lambda_1$, and $\lambda_3$) are included in an optical beam 323, which is propagated from the opposite end of waveguide 325. Accordingly, the Bragg wavelength $\lambda_2$ is filtered or dropped from optical beam 323. In one embodiment, optical beam 319 may be an optical communications beam or the like on which data is encoded. In one embodiment, wave division multiplexing (WDM) or dense wave division multiplexing (DWDM) or the like may be employed with optical beam 319 such that a different channel is encoded with each of the wavelengths (e.g. $\lambda_1$, $\lambda_2$, $\lambda_3$, etc.) included in optical beam 319.

In one embodiment, the Bragg wavelength, $\lambda_B$, that is reflected or filtered by tunable Bragg grating 301 is tunable or adjustable with a heater 311 disposed proximate to waveguide 325. In an embodiment, heater 311 includes a thin-film heater or the like or other future arising technology that controls the temperature of semiconductor substrate 303 and polysilicon 305 of Bragg grating 301 in waveguide 325 along optical path 317. For instance, silicon and polysilicon have large index of refraction variations with temperature on the order of approximately $2 \times 10^{-4}/°$ K. It is appreciated that the index of refraction variations with temperature for semiconductor materials such as silicon and/or polysilicon are two orders of magnitude greater than other materials such as for example silica or the like. Thus, by controlling the temperature of semiconductor substrate 303 and polysilicon 305, relatively significant shifts in the center wavelength of light reflected by a tunable Bragg grating 301 are provided in accordance with the teachings of the present invention.

Figure 5:
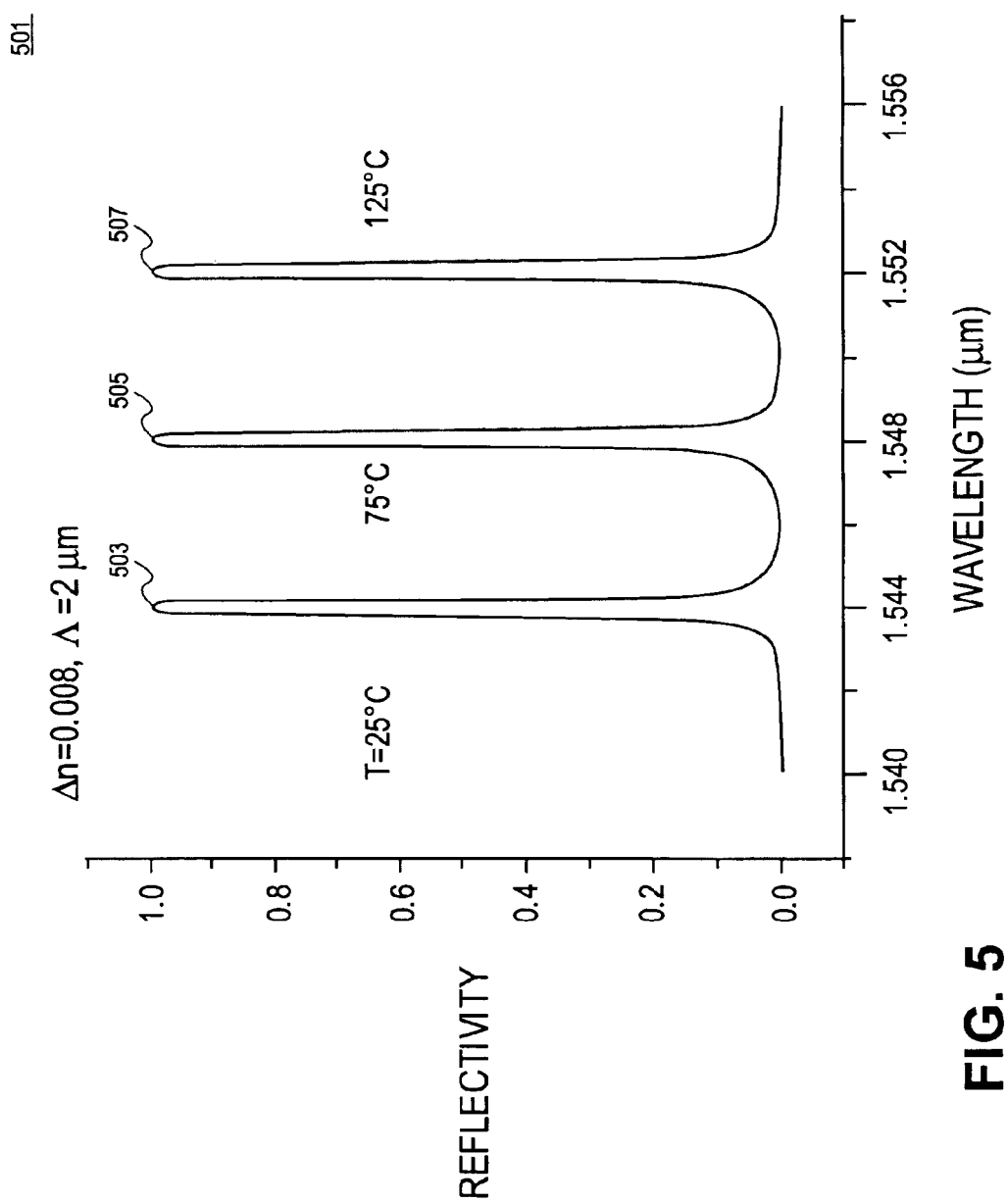
FIG. 5 is a diagram illustrating the relationship between reflectivity and wavelength at different temperatures of one embodiment of a tunable Bragg grating in accordance with the teachings of the present invention.

To illustrate, FIG. 5 is a diagram 501 illustrating the relationship between reflectivity and wavelength at different temperatures of one embodiment of a tunable Bragg grating 301 in accordance with the teachings of the present invention. In the illustrated example, heater 311 is used to adjust the temperature of silicon/polysilicon waveguide Bragg grating to 25° C., 75° C. and 125° C. In the illustrated embodiment, the difference in the effective indexes of refraction between the silicon and polysilicon $\Delta n_{\mathit{eff}}$ is approximately 0.008 and the period of the grating $\Lambda$ is approximately 2 $\mu$m.

Plot 503 shows that at 25° C., the center wavelength of an optical beam that is reflected by the silicon/polysilicon waveguide Bragg grating is approximately 1.544 $\mu$m in the illustrated embodiment. In comparison, plot 505 shows that at 75° C., the center wavelength of an optical beam that is reflected is shifted or tuned to be approximately 1.548 $\mu$m, while plot 507 shows that at 125° C., the center wavelength of an optical beam that is reflected is shifted or tuned to be approximately 1.552 $\mu$m. In one embodiment, a thin-film heater utilized for heater 311 provides center wavelength tuning speeds in the order of microseconds.

It is appreciated of course that the materials, dimensions, wavelengths and index of refraction values utilized in the embodiment illustrated in FIG. 5 are provided for explanation purposes and that other materials, dimensions, wavelengths and index of refraction values may be utilized in accordance with the teachings of the present invention.

Figure 6A:
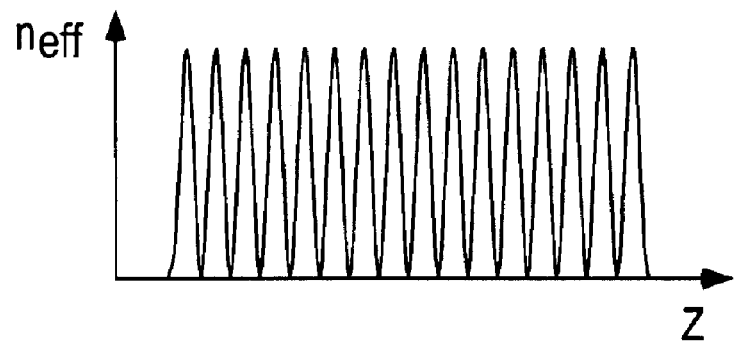
FIG. 6A is a diagram illustrating the effective index of refraction along an optical path of one embodiment of a tunable uniform Bragg grating in accordance with the teachings of the present invention.

In one embodiment, there are sidelobes on the sides of each maxima of plots 503, 505 and 507. When uniform or periodic Bragg gratings are utilized, the sidelobes are usually relatively large. An example of a uniform grating with periodic perturbations in the effective index of refraction along the optical path of the Bragg grating is illustrated in diagram 601 in FIG. 6A. As shown along the y-axis, the effective index of refraction $n_{\mathit{eff}}$ is perturbed periodically or regularly down the optical path, which shown as Z along the x-axis of diagram 601.

Figure 6B:
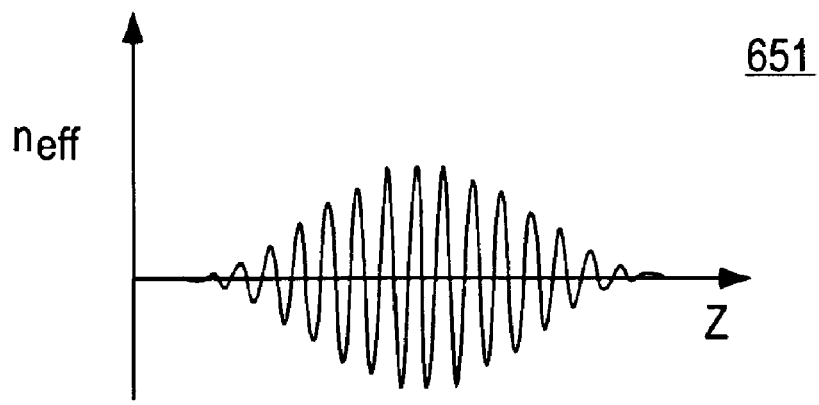
FIG. 6B is a diagram illustrating the effective index of refraction along an optical path of one embodiment of a tunable apodized Bragg grating in accordance with the teachings of the present invention.

In one embodiment, an apodized Bragg grating is provided in accordance with the teachings of the present invention, which reduces the sidelobes on the sides of each maxima of plots 503, 505 and 507. One embodiment of an apodized grating utilized in accordance with the teachings of the present invention is illustrated in diagram 651 of FIG. 6B. An apodized grating is provided with quasi-periodic perturbations in the effective index of refraction along the optical path of the Bragg grating. The perturbation in the effective index of refraction can be realized by either changing refractive index of constitutive materials or varying layer widths (duty cycle) along the Bragg grating. It is noted that an embodiment of a raised-cosine apodized grating is illustrated in diagram 651 of FIG. 6B. It is appreciated that other types of apodized gratings may be utilized in accordance with the teachings of the present invention including but not limited to Gaussian-apodized, chirped, discrete phase shift, superstructure or the like.

Figure 7:
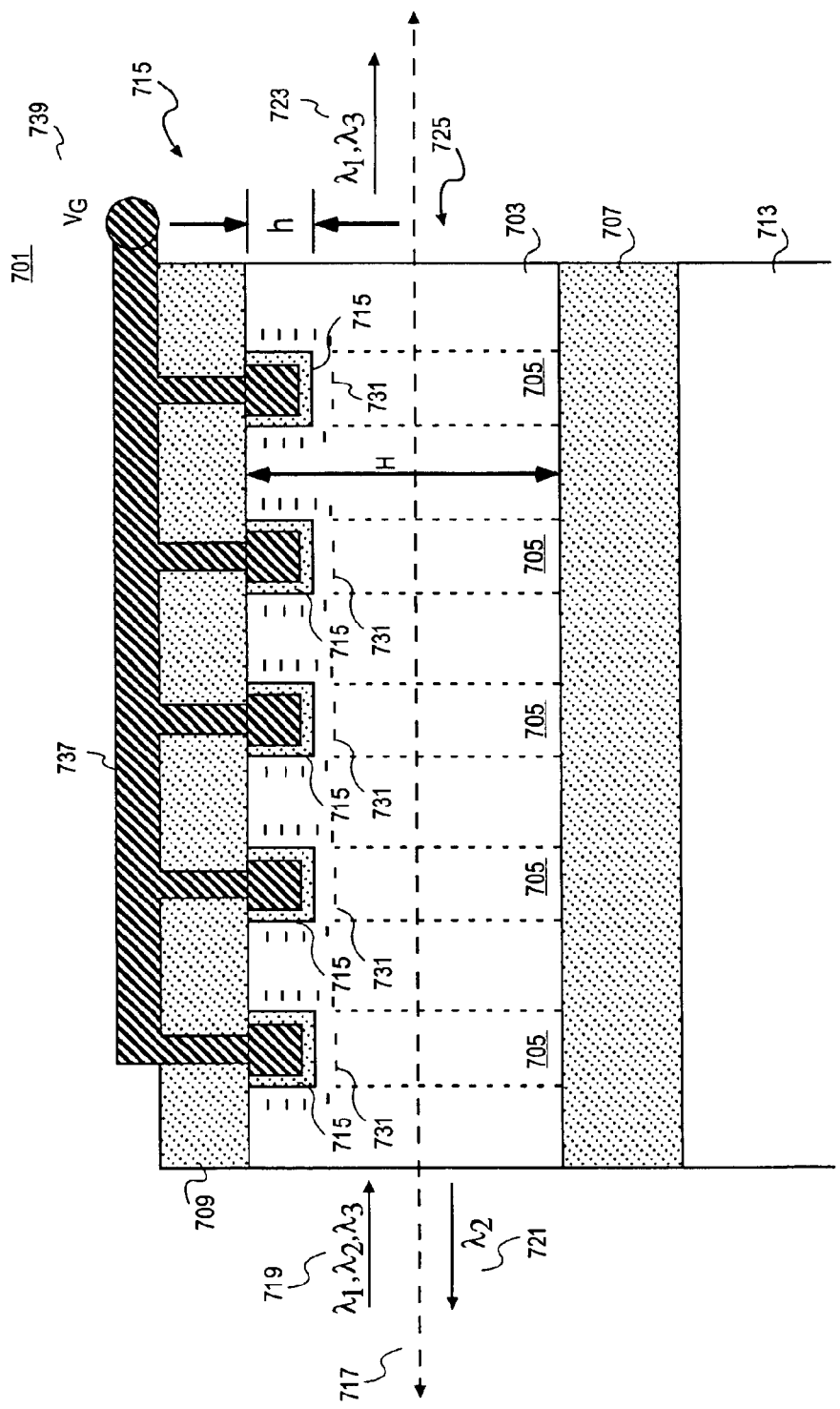
FIG. 7 is a block diagram illustrating a cross section of another embodiment of a tunable Bragg grating disposed in a semiconductor substrate including charge modulated regions in accordance with the teachings of the present invention.

FIG. 7 is a block diagram illustrating a cross section of another embodiment of a tunable Bragg grating 701 in accordance with the teachings of the present invention. As shown in the depicted embodiment, tunable Bragg grating 701 includes a semiconductor substrate 703 having an optical path 717 through which an optical beam 719 is directed. In one embodiment, semiconductor substrate 703 is included in an SOI wafer 715 such that semiconductor substrate 703 is disposed between a buried insulating layer 707 and insulating layer 709. In addition, buried insulating layer 707 is disposed between semiconductor substrate layer 703 and semiconductor substrate layer 713. In one embodiment, an optical waveguide 725 is provided with semiconductor substrate 703 with insulating layers 707 and 709 serving as cladding to confine optical beam 719 to remain within waveguide 725 between the ends.

In the embodiment depicted in FIG. 7, tunable Bragg grating 701 is provided with trenched silicon structures. In particular, a plurality of conductor-insulator-semiconductor structures 715, similar to for example metal-oxide-semiconductor (MOS) structures, are disposed along optical path 717 in semiconductor substrate 703. Each structure 715 is coupled to receive a modulation signal $V_G$ 739 through conductor 737, which is coupled to each structure 715 through insulating layer 709. As shown in FIG. 7, the height of each structure 715 in waveguide 725 is h. In one embodiment, the height h of the structures 715 is chosen such that propagation loss of optical beam 719 in waveguide 725 along optical path 717 is acceptable.

In the embodiment depicted in FIG. 7, periodic or quasi-periodic perturbations in an effective index of refraction $n_{eff}$ are provided along an optical path 717 through waveguide 725 in semiconductor substrate 703. In particular, the effective index of refraction $n_{eff}$ is related or equal to a function of the geometry of waveguide 725 along optical path 717 as well as the index of refraction of the specific medium (e.g. $n_{Si}$) and the wavelength $\lambda$ included in optical beam 719.

Accordingly, assuming semiconductor substrate 703 includes silicon, the effective index of refraction $n_{eff}$ is a function of the height H of waveguide 725 not including structures 715, $n_{Si}$ and $\lambda$. In the regions 705 of waveguide 725 including structures 715, the effective index of refraction $n'_{eff}$ is a function of the height (H–h) of waveguide 725 including structures 715, $n_{Si}$ and $\lambda$. Thus, the difference in effective index of refraction is $$\Delta n_{eff} = n_{eff} - n'_{eff}. \qquad \text{(Equation 2)}$$

In the depicted embodiment, structures 715 are biased in response to modulation signal $V_G$ 739 through conductor 737 such that the concentration of free charge carriers in charge modulated regions 731 in the semiconductor substrate layer 703 proximate to the structures 715. For example, assuming a positive voltage is applied with modulation signal $V_G$ 739 through conductor 737, electrons in semiconductor substrate 703 are swept into charge modulated regions 731. When for example less positive voltage is applied to conductor 737, the concentration of free charge carriers swept into charge modulated regions 731 is reduced.

It is noted that for explanation purposes, charge modulated regions 731 have been illustrated to include negative charge. It is appreciated that in another embodiment, the polarities of these charges and the voltages of modulation signal $V_G$ 739 may be reversed in accordance with the teachings of the present invention.

In one embodiment, the effective index of refraction $n_{eff}$ in charge modulated regions 731 is modulated in response to the modulation signal $V_G$ 739 due to the plasma optical effect. The plasma optical effect arises due to an interaction between the optical electric field vector and free charge carriers that may be present along the optical path 717 of the optical beam 719. The electric field of the optical beam 719 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. In the case of the plasma optical effect in silicon, the effective change in the index of refraction $\Delta n_{eff}$ due to the free electron ($\Delta N_e$) and hole ($\Delta N_h$) concentration change is given by:

$$\Delta n_{eff} = -\frac{e^2 \lambda^2}{8\pi^2 c^2 \varepsilon_0 n_0}\left(\frac{\Delta N_e}{m_e^*} + \frac{\Delta N_h}{m_h^*}\right) \qquad \text{(Equation 3)}$$

where $n_0$ is the nominal index of refraction for silicon, e is the electronic charge, c is the speed of light, $\varepsilon_0$ is the permittivity of free space, $m_e^*$ and $m_h^*$ are the electron and hole effective masses, respectively.

It is noted that tunable Bragg grating 701 has been illustrated in FIG. 7 with five structures 715. It is appreciated that in other embodiments, tunable Bragg grating 701 may include a greater or fewer number of structures 715 in accordance with the teachings of the present invention.

In operation, optical beam 719 is directed along optical path 717 into one end of waveguide 725. In one embodiment, optical beam 719 includes infrared or near infrared light and is confined with insulating layers 707 and 709 to remain within waveguide 725 along optical path 717 between the ends of waveguide 725. In one embodiment, optical beam 719 is confined as a result of total internal reflection since the oxide material of insulating layers 707 and 709 has a smaller index of refraction than the semiconductor material of semiconductor substrate 703.

In one embodiment, optical beam 719 includes a plurality of channels corresponding to wavelengths including for example $\lambda_1$, $\lambda_2$ and $\lambda_3$. As a result of the effective refractive index difference $\Delta n_{eff}$ described above in the periodic or quasi-periodic perturbations in the effective index of refraction along optical path 717, a multiple reflection of optical beam 719 occurs when a Bragg condition or phase matching condition is satisfied, as described above in Equation 1.

To illustrate, FIG. 7 shows a Bragg condition existing for $\lambda_B$ equal to $\lambda_2$. Accordingly, an optical beam 721 having a center wavelength $\lambda_2$ is shown to be reflected back out of the waveguide 725 out from the end into which optical beam 719 is directed. In addition, the remainder of optical beam 719 continues to propagate along optical path 717 through waveguide 525 such that the remaining wavelengths (e.g. $\lambda_1$ and $\lambda_3$) are included the an optical beam 723, which is propagated from the opposite end of waveguide 725. Accordingly, the Bragg wavelength $\lambda_2$ is filtered or dropped from optical beam 723.

In one embodiment, the center wavelength that is reflected or filtered by tunable Bragg grating 701 is tunable or adjustable by appropriately modulating charge in modulated charge regions 731 with modulation signal $V_G$ 739 to adjust the conditions for the Bragg wavelength $\lambda_B$. Indeed, as discussed above, the difference in effective refractive index $\Delta n_{eff}$ along optical path 717 is modulated in response to modulation signal $V_G$ 739 to tune the Bragg wavelength $\lambda_B$ that is reflected or filtered by tunable Bragg grating 701 in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method, comprising:
splitting a first optical beam having multiple wavelengths into second and third optical beams with a first 3 dB optical coupler disposed in a semiconductor substrate;
reflecting portions of the second and third optical beams having a tunable wavelength back to the first 3 dB optical coupler with first and second pluralities of silicon and polysilicon interfaces, respectively, disposed along the semiconductor substrate and oriented substantially perpendicular to the semiconductor substrate;
directing portions of the second and third optical beams not reflected by the first and second pluralities of silicon and polysilicon interfaces to a second 3 dB optical coupler disposed in the semiconductor substrate; and
combining the portions of the second and third optical beams not reflected by the first and second pluralities of silicon and polysilicon interfaces into a fourth optical beam with the second 3 dB optical coupler.

2. The method of claim 1 further comprising adjusting a temperature of the first and second pluralities of silicon and polysilicon interfaces so as to adjust the tunable wavelength.

3. The method of claim 1 further comprising combining the portions of the second and third optical beams having the tunable wavelength reflected from the first and second pluralities of silicon and polysilicon interfaces with the first 3 dB optical coupler to output a fifth optical beam from the first 3 dB optical coupler.

4. The method of claim 1 further comprising:
splitting a sixth optical beam having the tunable wavelength into seventh and eighth optical beams with the second 3 dB optical coupler;
reflecting the seventh and eighth optical beams having the tunable wavelength back to the second 3 dB optical coupler with the first and second pluralities of silicon and polysilicon interfaces, respectively;
combining the seventh and eighth optical beams reflected by the first and second pluralities of silicon and polysilicon interfaces into the fourth optical beam with the second 3 dB optical coupler.

5. The method of claim 4 further comprising adjusting a phase of the seventh optical beam so as to correct an optical path imbalance between respective optical paths through which the seventh and eighth optical beams are optically coupled to propagate.

6. The method of claim 5 wherein adjusting the phase of the seventh optical beam comprises adjusting a temperature of the semiconductor substrate including the optical path through which the seventh optical beam propagates.

7. The method of claim 1 further comprising adjust a phase of the second optical beam so as to correct an optical path imbalance between respective optical paths through which the second and third optical beams are optically coupled to propagate.

8. The method of claim 7 wherein adjusting the phase of the second optical beam comprises adjusting a temperature of the semiconductor substrate including the optical path through which the second optical beam propagates.

9. The method of claim 1 wherein reflecting portions of the second and third optical beams comprises perturbing an effective index of refraction a plurality of times along the semiconductor substrate to form first and second tunable Bragg gratings, respectively, disposed in the semiconductor substrate.

10. A method, comprising:
splitting a first optical beam having multiple wavelengths into second and third optical beams with a first 3 dB optical coupler disposed in a semiconductor substrate;
reflecting portions of the second and third optical beams having a tunable wavelength back to the first 3 dB optical coupler with first and second pluralities of charge modulated regions, respectively;
directing portions of the second and third optical beams not reflected by the first and second pluralities of charge modulated regions to a second 3 dB optical coupler disposed in the semiconductor substrate; and
combining the portions of the second and third optical beams not reflected by the first and second pluralities of charged modulated regions into a fourth optical beam with the second 3 dB optical coupler.

11. The method of claim 10 further comprising adjusting a charge concentration in the first and second pluralities of charge modulated regions in response to a modulation signal so as to adjust the tunable wavelength.

12. The method of claim 10 further comprising combining the portions of the second and third optical beams having the tunable wavelength reflected from the first and second pluralities of charge modulated regions with the first 3 dB optical coupler to output a fifth optical beam from the first 3 dB optical coupler.

13. The method of claim 10 further comprising:
splitting a sixth optical beam having the tunable wavelength into seventh and eighth optical beams with the second 3 dB optical coupler;
reflecting the seventh and eighth optical beams having the tunable wavelength back to the second 3 dB optical coupler with the first and second pluralities of charge modulated regions, respectively;
combining the seventh and eighth optical beams reflected by the first and second pluralities of charge modulated regions into the fourth optical beam with the second 3 dB optical coupler.

14. The method of claim 13 further comprising adjust a phase of the seventh optical beam so as to correct an optical path imbalance between respective optical paths through which the seventh and eighth optical beams are optically coupled to propagate.

15. The method of claim 10 further comprising adjust a phase of the second optical beam so as to correct an optical path imbalance between respective optical paths through which the second and third optical beams are optically coupled to propagate.

16. An apparatus, comprising:
first and second 3 dB optical couplers disposed in a semiconductor substrate, the first 3 dB optical coupler optically coupled to receive a first optical beam and split the first optical beam into second and third optical beams having an approximately $\pi/2$ phase difference, the second optical coupler optically coupled to receive the second and third optical beams and output a fourth optical beam; and
first and second tunable Bragg gratings disposed in the semiconductor substrate having respective optical paths through which the second and third optical beams are optically coupled to propagate between the first and second 3 dB optical couplers, the first and second tunable Bragg gratings each including a plurality of silicon and polysilicon interfaces along the respective optical paths such that there are a plurality of perturbations of a refractive index of the semiconductor substrate along the respective optical paths, the plurality of silicon and polysilicon interfaces oriented substantially perpendicular to the semiconductor substrate, the first and second tunable Bragg gratings optically coupled to reflect back to the first 3 dB optical coupler a portion of the second and third optical beams having a tunable wavelength.

17. The apparatus of claim 16 wherein the first optical beam includes multiple wavelengths including the tunable wavelength, wherein the tunable wavelength is dropped from the second and third optical beams as a result of the reflection of the portion of the second and third optical beams by the first and second tunable Bragg gratings, wherein a fifth optical beam including the tunable wavelength resulting from the reflection of the portion of the second and third optical beams by the first and second tunable Bragg gratings is output from the first 3 dB optical coupler.

18. The apparatus of claim 16 wherein the second 3 dB optical coupler is further optically coupled to receive a sixth optical beam having the tunable wavelength, the second 3 dB optical coupler to split the sixth optical beam into seventh and eighth optical beams having an approximately $\pi/2$ phase difference, the first and second tunable Bragg gratings optically coupled to receive the seventh and eighth optical beams from the second 3 dB optical coupler and reflect back to the second 3 dB optical coupler the seventh and eighth optical beams having the tunable wavelength, the fourth optical beam output by the second 3 dB optical coupler to have multiple wavelengths including the tunable wavelength of the sixth optical beam.

19. The apparatus of claim 16 wherein the first and second tunable Bragg gratings include first and second heaters, respectively, disposed proximate to the semiconductor substrate including the plurality of silicon and polysilicon interfaces, wherein a temperature of the semiconductor substrate including the plurality of silicon and polysilicon interfaces is responsive to the first and second heaters, respectively, wherein the tunable wavelength is responsive to the temperature of the semiconductor substrate including the plurality of silicon and polysilicon interfaces.

20. The apparatus of claim 18 further comprising:
a first phase adjuster optically coupled to adjust a phase of the second optical beam, the phase adjuster optically coupled to correct an optical path imbalance between the respective optical paths through which the second and third optical beams are optically coupled to propagate; and
a second phase adjuster optically coupled to adjust a phase of the seventh optical beam, the phase adjuster optically coupled to correct an optical path imbalance between the respective optical paths through which the seventh and eighth optical beams are optically coupled to propagate.

21. The apparatus of claim 20 wherein the first and second phase adjusters comprises a third and fourth heaters, respectively, disposed proximate to the semiconductor substrate including the optical paths through which the second and seventh optical beams propagate.

22. The apparatus of claim 16 wherein the first and second 3 dB optical couplers include 2×2 multimode interference (MMI) couplers or waveguide couplers disposed in the semiconductor substrate.

23. The apparatus of claim 22 wherein the 2×2 MMI couplers have inputs and outputs that include tapered rib waveguides disposed in the semiconductor substrate.

24. An apparatus, comprising:
first and second 3 dB optical couplers disposed in a semiconductor substrate, the first 3 dB optical coupler optically coupled to receive a first optical beam and split the first optical beam into second and third optical beams having an approximately $\pi/2$ phase difference, the second optical coupler optically coupled to receive the second and third optical beams and output a fourth optical beam; and
first and second tunable Bragg gratings disposed in the semiconductor substrate having respective optical paths through which the second and third optical beams are optically coupled to propagate between the first and second 3 dB optical couplers, the first and second tunable Bragg gratings each including a plurality of charge modulated regions along the respective optical paths to establish a plurality of perturbations of a refractive index of the semiconductor substrate along the respective optical paths, the first and second tunable Bragg gratings optically coupled to reflect back to the first 3 dB optical coupler a portion of the second and third optical beams having a tunable wavelength.

25. The apparatus of claim 24 further comprising:
an insulating layer disposed proximate to the semiconductor substrate; and
a plurality of conductive elements disposed proximate to the insulating layer such that the insulating layer is disposed between the plurality of conductive elements and the semiconductor substrate, the plurality of conductive elements coupled to receive a modulation signal, the plurality of charge modulated regions coupled to be modulated in response to the modulation signal.

26. The apparatus of claim 24 wherein the first optical beam includes multiple wavelengths including the tunable wavelength, wherein the tunable wavelength is dropped from the second and third optical beams as a result of the reflection of the portion of the second and third optical beams by the first and second tunable Bragg gratings, wherein a fifth optical beam including the tunable wavelength resulting from the reflection of the portion of the second and third optical beams by the first and second tunable Bragg gratings is output from the first 3 dB optical coupler.

27. The apparatus of claim 24 wherein the second 3 dB optical coupler is further optically coupled to receive a sixth optical beam having the tunable wavelength, the second 3 dB optical coupler to split the sixth optical beam into seventh and eighth optical beams having an approximately $\pi/2$ phase difference, the first and second tunable Bragg gratings optically coupled to receive the seventh and eighth optical beams from the second 3 dB optical coupler and reflect back to the second 3 dB optical coupler the seventh and eighth optical beams having the tunable wavelength, the fourth optical beam output by the second 3 dB optical coupler to have multiple wavelengths including the tunable wavelength of the sixth optical beam.

28. The apparatus of claim 27 further comprising:
a first phase adjuster optically coupled to adjust a phase of the second optical beam, the phase adjuster optically coupled to correct an optical path imbalance between the respective optical paths through which the second and third optical beams are optically coupled to propagate; and a second phase adjuster optically coupled to adjust a phase of the seventh optical beam, the phase adjuster optically coupled to correct an optical path imbalance between the respective optical paths through which the seventh and eighth optical beams are optically coupled to propagate.

29. The apparatus of claim 24 wherein the first and second 3 dB optical couplers include 2×2 multimode interference (MMI) couplers or waveguide couplers disposed in the semiconductor substrate.

30. The apparatus of claim 29 wherein the 2×2 MMI couplers have inputs and outputs that include tapered rib waveguides disposed in the semiconductor substrate.

31. A method, comprising:
splitting a first optical beam having multiple wavelengths into second and third optical beams with a first 3 dB optical coupler disposed in a semiconductor substrate;
reflecting portions of the second and third optical beams having a tunable wavelength back to the first 3 dB optical coupler with first and second pluralities of silicon and polysilicon interfaces, respectively, disposed along the semiconductor substrate and oriented substantially perpendicular to the semiconductor substrate;
directing portions of the second and third optical beams having the tunable wavelength reflected by the first and second pluralities of silicon and polysilicon interfaces back to the first 3 dB optical coupler; and
combining the portions of the second and third optical beams having the tunable wavelength reflected by the first and second pluralities of silicon and polysilicon interfaces into a fourth optical beam with the first 3 dB optical coupler.

32. The method of claim 31 further comprising adjusting a temperature of the first and second pluralities of silicon and polysilicon interfaces so as to adjust the tunable wavelength.

33. The method of claim 31 further comprising:
directing portions of the second and third optical beams not reflected by the first and second pluralities of silicon and polysilicon interfaces to a second 3 dB optical coupler disposed in the semiconductor substrate; and
combining the portions of the second and third optical beams not reflected by the first and second pluralities of silicon and polysilicon interfaces into a fifth optical beam with the second 3 dB optical coupler.

34. The method of claim 33 further comprising:
splitting a sixth optical beam having the tunable wavelength into seventh and eighth optical beams with the second 3 dB optical coupler;
reflecting the seventh and eighth optical beams having the tunable wavelength back to the second 3 dB optical coupler with the first and second pluralities of silicon and polysilicon interfaces, respectively;
combining the seventh and eighth optical beams reflected by the first and second pluralities of silicon and polysilicon interfaces into the fifth optical beam with the second 3 dB optical coupler.

35. The method of claim 34 further comprising adjusting a phase of the seventh optical beam so as to correct an optical path imbalance between respective optical paths through which the seventh and eighth optical beams are optically coupled to propagate.

36. The method of claim 35 wherein adjusting the phase of the seventh optical beam comprises adjusting a temperature of the semiconductor substrate including the optical path through which the seventh optical beam propagates.

37. The method of claim 31 further comprising adjusting a phase of the second optical beam so as to correct an optical path imbalance between respective optical paths through which the second and third optical beams are optically coupled to propagate.

38. The method of claim 37 wherein adjusting the phase of the second optical beam comprises adjusting a temperature of the semiconductor substrate including the optical path through which the second optical beam propagates.

39. The method of claim 31 wherein reflecting portions of the second and third optical beams comprises perturbing an effective index of refraction a plurality of times along the semiconductor substrate to form first and second tunable Bragg gratings, respectively, disposed in the semiconductor substrate.

40. An apparatus, comprising:
a first 3 dB optical coupler disposed in a semiconductor substrate, the first 3 dB optical coupler optically coupled to receive a first optical beam and split the first optical beam into second and third optical beams having an approximately $\pi/2$ phase difference; and
first and second tunable Bragg gratings disposed in the semiconductor substrate having respective optical paths through which the second and third optical beams are optically coupled to propagate from the first 3 dB optical couplers to the first and second tunable Bragg gratings, the first and second tunable Bragg gratings each including a plurality of silicon and polysilicon interfaces along the respective optical paths such that there are a plurality of perturbations of a refractive index of the semiconductor substrate along the respective optical paths, the plurality of silicon and polysilicon interfaces oriented substantially perpendicular to the semiconductor substrate, the first and second tunable Bragg gratings optically coupled to reflect back to the first 3 dB optical coupler portions of the second and third optical beams having a tunable wavelength, wherein the first 3 dB optical coupler is optically coupled to combine the portions of the second and third optical beams having the tunable wavelength into a fourth optical beam having the tunable wavelength.

41. The apparatus of claim 40 further comprising a second 3 dB coupler optically coupled to the first and second Bragg gratings to receive portions of the second and third optical beams not having the tunable wavelength, the second 3 dB optical coupler optically coupled to combine the portions of the not having the tunable wavelength into a fifth optical beam output by the second 3 dB optical coupler.

42. The apparatus of claim 41 wherein the second 3 dB optical coupler is further optically coupled to receive a sixth optical beam having the tunable wavelength, the second 3 dB optical coupler to split the sixth optical beam into seventh and eighth optical beams having an approximately $\pi/2$ phase difference, the first and second tunable Bragg gratings optically coupled to receive the seventh and eighth optical beams from the second 3 dB optical coupler and reflect back to the second 3 dB optical coupler the seventh and eighth optical beams having the tunable wavelength, the fifth optical beam output by the second 3 dB optical coupler to have multiple wavelengths including the tunable wavelength of the sixth optical beam.

43. The apparatus of claim 42 further comprising:
a first phase adjuster optically coupled to adjust a phase of the second optical beam, the phase adjuster optically coupled to correct an optical path imbalance between the respective optical paths through which the second and third optical beams are optically coupled to propagate; and a second phase adjuster optically coupled to adjust a phase of the seventh optical beam, the phase adjuster optically coupled to correct an optical path imbalance between the respective optical paths through which the seventh and eighth optical beams are optically coupled to propagate.

44. The apparatus of claim 43 wherein the first and second phase adjusters comprises a third and fourth heaters, respectively, disposed proximate to the semiconductor substrate including the optical paths through which the second and seventh optical beams propagate.

45. The apparatus of claim 41 wherein the first and second 3 dB optical couplers include 2×2 multimode interference (MMI) couplers or waveguide couplers disposed in the semiconductor substrate.

46. The apparatus of claim 45 wherein the 2×2 MMI couplers have inputs and outputs that include tapered rib waveguides disposed in the semiconductor substrate.

47. The apparatus of claim 40 wherein the first and second tunable Bragg gratings include first and second heaters, respectively, disposed proximate to the semiconductor substrate including the plurality of silicon and polysilicon interfaces, wherein a temperature of the semiconductor substrate including the plurality of silicon and polysilicon interfaces is responsive to the first and second heaters, respectively, wherein the tunable wavelength is responsive to the temperature of the semiconductor substrate including the plurality of silicon and polysilicon interfaces.

48. An apparatus, comprising:

a first 3 dB optical couplers disposed in a semiconductor substrate, the first 3 dB optical coupler optically coupled to receive a first optical beam and split the first optical beam into second and third optical beams having an approximately $\pi/2$ phase difference; and first and second tunable Bragg gratings disposed in the semiconductor substrate having respective optical paths through which the second and third optical beams are optically coupled to propagate from the first 3 dB optical couplers to the first and second tunable Bragg gratings, the first and second tunable Bragg gratings each including a plurality of charge modulated regions along the respective optical paths to establish a plurality of perturbations of a refractive index of the semiconductor substrate along the respective optical paths, the first and second tunable Bragg gratings optically coupled to reflect back to the first 3 dB optical coupler portions of the second and third optical beams having a tunable wavelength, wherein the first 3 dB optical coupler is optically coupled to combine the portions of the second and third optical beams having the tunable wavelength into a fourth optical beam having the tunable wavelength.

49. The apparatus of claim 48 further comprising:

an insulating layer disposed proximate to the semiconductor substrate; and a plurality of conductive elements disposed proximate to the insulating layer such that the insulating layer is disposed between the plurality of conductive elements and the semiconductor substrate, the plurality of conductive elements coupled to receive a modulation signal, the plurality of charge modulated regions coupled to be modulated in response to the modulation signal.

50. The apparatus of claim 48 further comprising a second 3 dB coupler optically coupled to the first and second Bragg gratings to receive portions of the second and third optical beams not having the tunable wavelength, the second 3 dB optical coupler optically coupled to combine the portions of the not having the tunable wavelength into a fifth optical beam output by the second 3 dB optical coupler.

51. The apparatus of claim 50 wherein the second 3 dB optical coupler is further optically coupled to receive a sixth optical beam having the tunable wavelength, the second 3 dB optical coupler to split the sixth optical beam into seventh and eighth optical beams having an approximately $\pi/2$ phase difference, the first and second tunable Bragg gratings optically coupled to receive the seventh and eighth optical beams from the second 3 dB optical coupler and reflect back to the second 3 dB optical coupler the seventh and eighth optical beams having the tunable wavelength, the fifth optical beam output by the second 3 dB optical coupler to have multiple wavelengths including the tunable wavelength of the sixth optical beam.

52. The apparatus of claim 51 further comprising:

a first phase adjuster optically coupled to adjust a phase of the second optical beam, the phase adjuster optically coupled to correct an optical path imbalance between the respective optical paths through which the second and third optical beams are optically coupled to propagate; and a second phase adjuster optically coupled to adjust a phase of the seventh optical beam, the phase adjuster optically coupled to correct an optical path imbalance between the respective optical paths through which the seventh and eighth optical beams are optically coupled to propagate.

53. The apparatus of claim 50 wherein the first and second 3 dB optical couplers include 2×2 multimode interference (MMI) couplers or waveguide couplers disposed in the semiconductor substrate.

54. The apparatus of claim 53 wherein the 2×2 MMI couplers have inputs and outputs that include tapered rib waveguides disposed in the semiconductor substrate.

* * * * *